Figure 1:
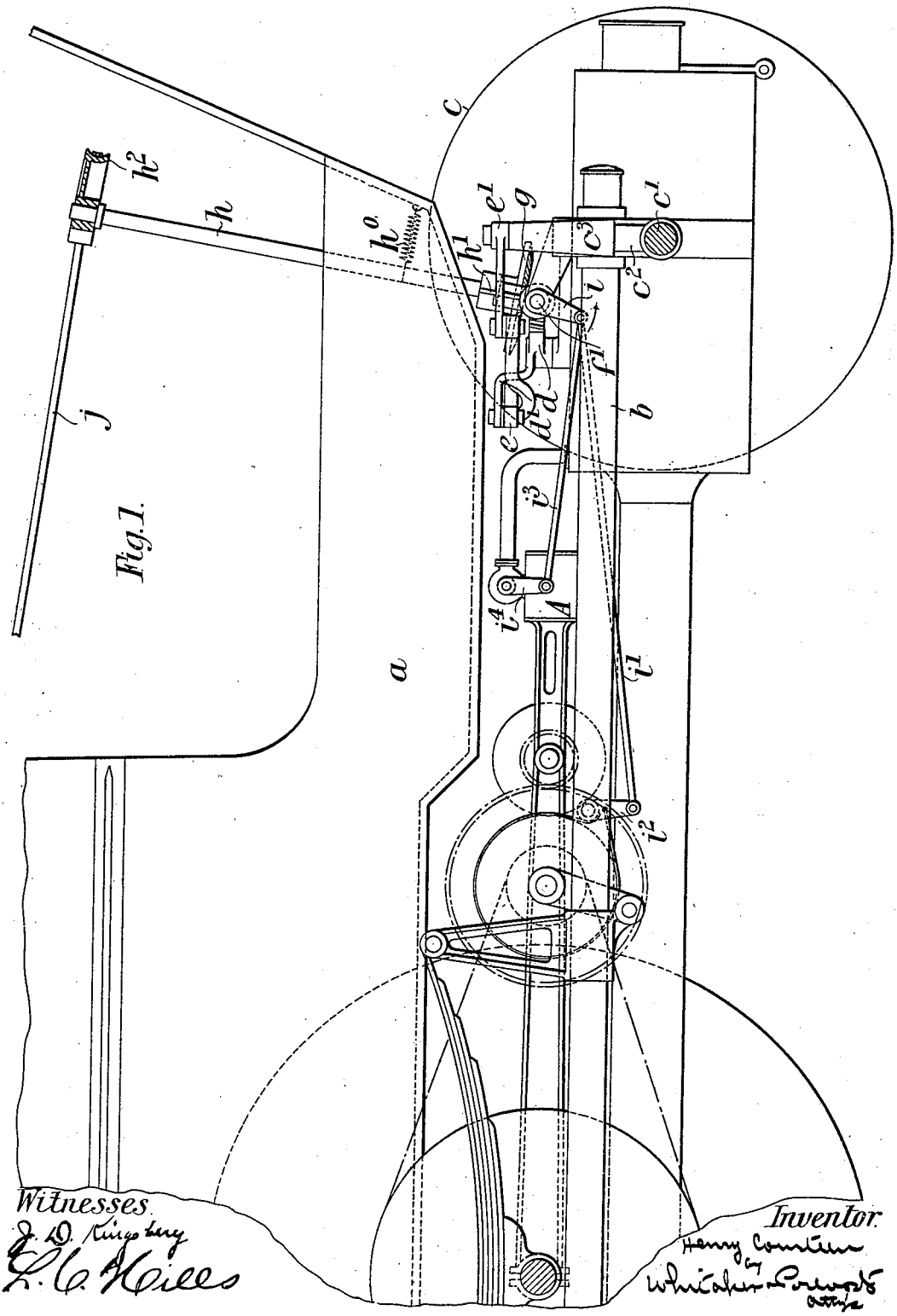

No. 665,651. Patented Jan. 8, 1901.
H. COURTEEN.
MOTOR VEHICLE.
(Application filed Feb. 15, 1900.)
(No Model.) 4 Sheets—Sheet 1.

Witnesses
Inventor

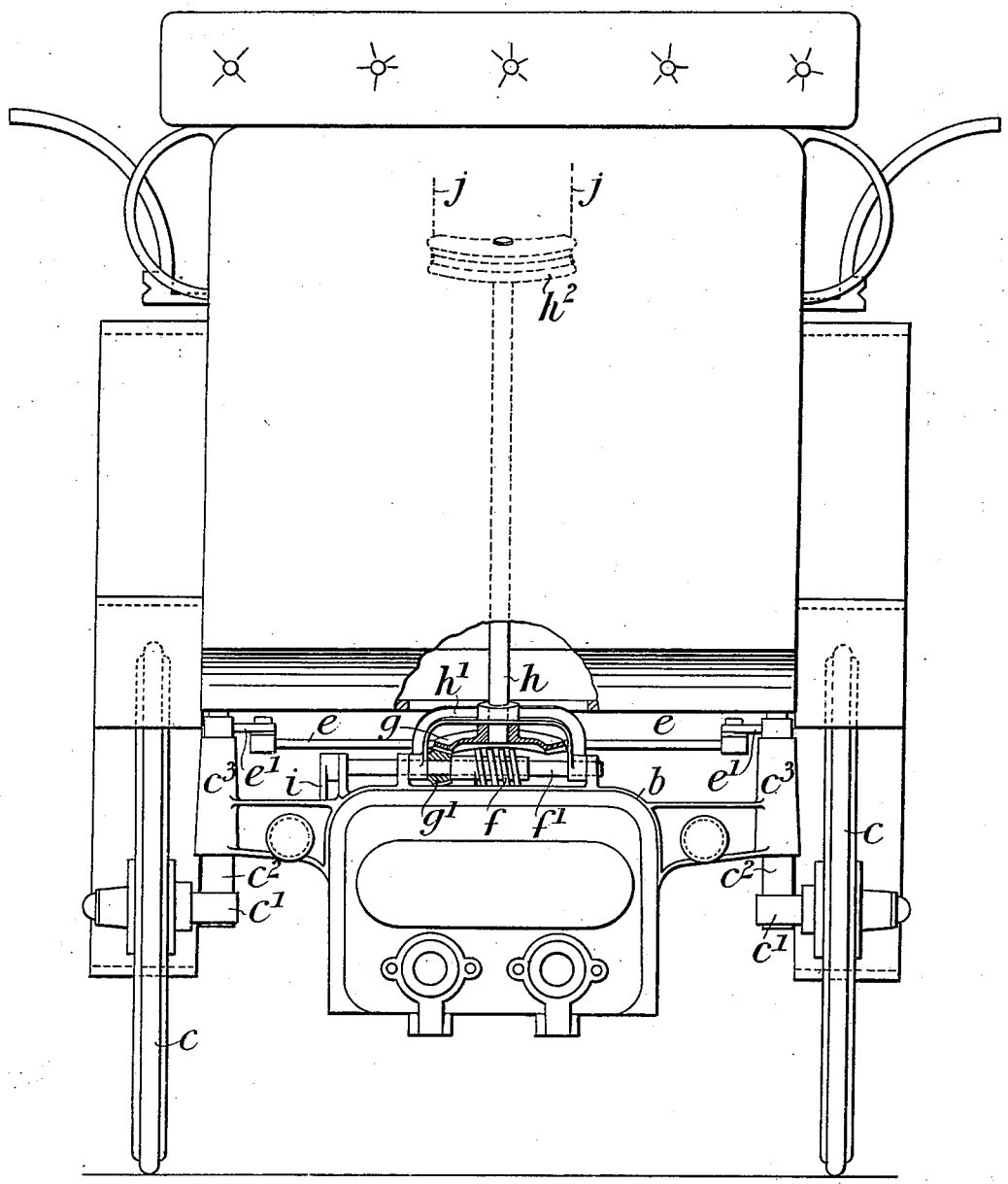

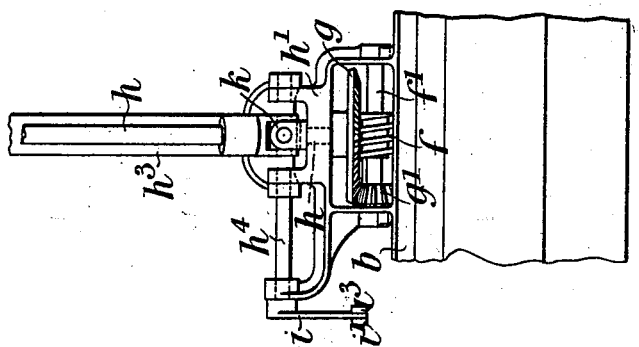
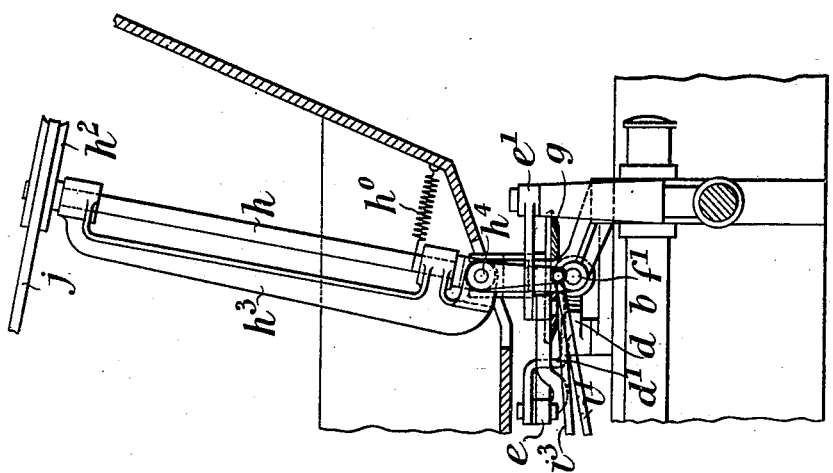
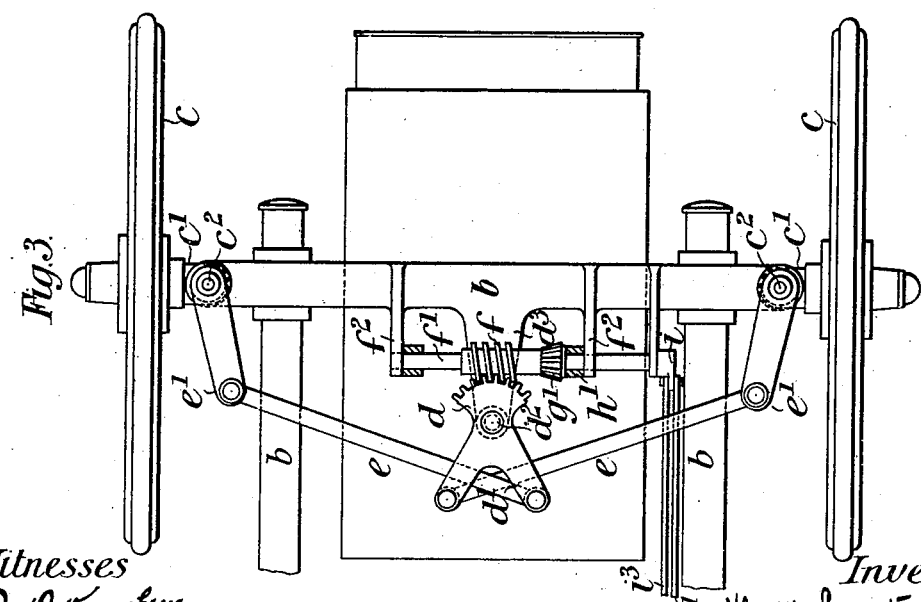

No. 665,651. Patented Jan. 8, 1901.
H. COURTEEN.
MOTOR VEHICLE.
(Application filed Feb. 15, 1900.)
(No Model.) 4 Sheets—Sheet 4.
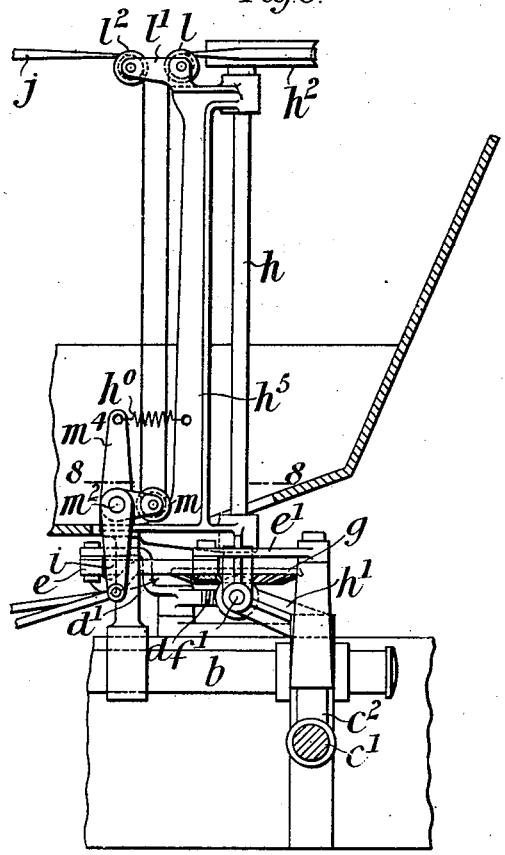
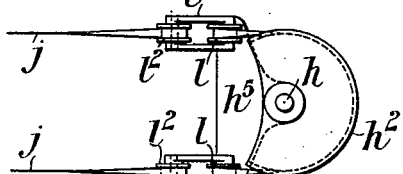
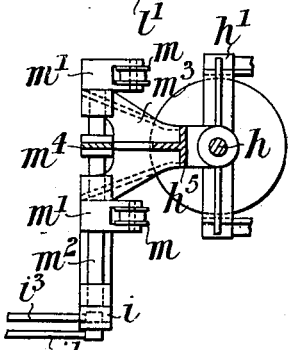
Witnesses
J. D. Kingsbury
L. C. Hills
Inventor
Henry Courteen
by Whitaker Prevost
Attys.

UNITED STATES PATENT OFFICE.

HENRY COURTEEN, OF DEVIZES, ENGLAND.

MOTOR-VEHICLE.

SPECIFICATION forming part of Letters Patent No. 665,651, dated January 8, 1901.

Application filed February 15, 1900. Serial No. 5,319. (No model.)

*To all whom it may concern:*

Be it known that I, HENRY COURTEEN, a subject of the Queen of Great Britain, residing at Eversley, Potterne road, Devizes, in the county of Wilts, England, have invented new and useful Improvements in Self-Moving Road-Vehicles, of which the following is a specification.

My invention relates to self-propelled vehicles in which the two steering-wheels are provided with vertical axes actuated for steering purposes by levers connecting them.

The object of the invention is to provide means for facilitating the steering and stopping of the vehicle.

According to the invention the links, connecting-rods, or levers which actuate the vertical shafts of the steering-wheels are operated by a toothed wheel or sector driven by a worm. This worm is caused to rotate by means of a crown-wheel or toothed sector driving a pinion on the worm-shaft and keyed to a steering-shaft having handles or suitable fittings for the attachment of reins for purposes of steering. Where reins are used, they may pass through a fixed guide or guides in such a way that when pulled tight the brake-lever is operated and the brake applied. In some cases the steering-handles or rein-attachment fittings are mounted on a hinged bracket, to which the brake is connected in such a manner as to come into operation when the hinged bracket is pulled backward or forward, as may be desired, either by the reins or by the steering-handles. In this case the steering-shaft may be provided toward its lower end with a universal joint, permitting it to move with the hinged bracket, or the steering-lever or part carrying the rein-attachment fittings may be connected to the crown-wheel or toothed sector by a flexible shaft. The hinged bracket is retained in its normal position by a suitable spring. Furthermore, the gear can be so arranged that the supply or exhaust valve to the motor propelling the vehicle is cut off or varied or the motor thrown out of gear simultaneously with the application of the brake.

In the accompanying drawings, Figure 1 is a sectional side elevation of the front portion of a self-propelled road-vehicle constructed according to the invention. Fig. 2 is a sectional front elevation thereof. Fig. 3 is a plan of the fore part of the vehicle. Fig. 4 is a sectional side elevation illustrating a modified arrangement of steering and brake gear. Fig. 5 is a front elevation of the front portion thereof. Fig. 6 is a view, similar to Fig. 4, of a further modification. Fig. 7 is a plan of the upper part of the same, and Fig. 8 is a section on the line 8 8 of Fig. 6.

$a$ is the body of the vehicle, the said body being supported in the usual manner upon the frame $b$.

$c\ c$ are the front or steering wheels of the vehicle, the said wheels being mounted upon short horizontal axles $c'\ c'$, connected to vertical shafts $c^2\ c^2$, which are supported in bearings $c^3\ c^3$, connected to the main frame $b$ of the vehicle, as clearly shown.

$d$ is the toothed sector, which is adapted to actuate the vertical shafts $c^2\ c^2$ through the medium of the links or connecting-rods $e\ e$, connected at one end to arms $d'\ d'$ upon the said sector and at the other end to the outer ends of arms $e'\ e'$, the inner ends of which are fixed to the vertical shafts $c^2\ c^2$. The sector $d$ is mounted upon a vertical shaft or spindle $d^2$, which is held in the end of a bracket $d^3$, secured to the main frame $b$ of the vehicle. Springs can, if desired, be provided upon the vertical shafts $c^2\ c^2$ to allow of play between the said shafts and the arms $e'\ e'$, controlling them for steering purposes.

$f$ is the worm, which meshes with the toothed sector $d$, the said worm being loosely mounted upon the cross-spindle $f'$, held in bearings in brackets $f^2$, fixed to or forming part of the frame $b$, as clearly shown in Fig. 3.

$g$ is the bevel or crown wheel, which actuates the worm $f$ through the medium of the bevel-pinion $g'$, carried by the worm $f$. This bevel-wheel is keyed upon the lower end of the steering-shaft $h$, rotatably mounted in a bracket constructed and arranged as hereinafter described.

By employing worm-gear to transmit the motion of the steering-shaft to the steering-wheels the important advantage is obtained that no back movement is possible—that is to say, that the steering-wheels are not affected by the vehicle striking against obstacles or by inequalities in the road.

In the arrangement illustrated in Figs. 1, 2, and 3 the steering-shaft $h$ is mounted at its lower end in a bracket $h'$, keyed upon the spindle $f'$. The end of this spindle $f'$ which projects beyond one of the brackets $f^2$ has keyed upon it an arm $i$, the lower end of which is connected by means of a rod $i'$ to a brake-lever $i^2$ and by means of a rod $i^3$ to a lever $i^4$, controlling the supply (or exhaust) valve of the motor A. The upper end of the steering-shaft $h$ has fitted upon it a grooved sector $h^2$, and reins or the like $j$ are passed around the said grooved sector, so that by pulling the one or the other end of the reins the shaft $h$ is turned in one or the other direction, thereby causing the sector $d$, and consequently the steering-wheels $c$, of the vehicle to be turned in the desired direction. To apply the brake to the vehicle, both reins are pulled toward the driver, thus swinging the steering-shaft $h$ and the bracket $h'$, together with the spindle $f'$, so as to turn the arm $i$ in the direction of the arrow, Fig. 1, and apply the brake, this movement also operating the supply-valve (or exhaust) of the motor.

$h^0$ is a spring for returning the shaft $h$ and connected parts to their normal position when the tension on the reins is relieved.

Figs. 4 and 5 show the arrangement wherein the shaft $h$ is formed at its lower end with a universal joint $k$ and wherein the bracket $h'$ is fixed. In this arrangement the upper part of the steering-shaft $h$ is rotatably carried in the bracket $h^3$, which is fixed at its lower end upon a spindle $h^4$, carried in the bracket $h'$, and arranged with its axis in the central plane of the universal joint. In this case when the reins are pulled in the manner above described the upper part only of the steering-shaft $h$ is pulled toward the driver, carrying with it the bracket $h^3$ and turning the shaft $h^4$, which carries the arm $i$, thus operating the brake and supply (or exhaust) valve, as above mentioned.

In Figs. 6, 7, and 8 I have shown an arrangement wherein the steering-shaft $h$ is mounted in a bracket $h^5$, which is an extension of the bracket $h'$, fixed to the frame $b$ and carrying the worm-gear. In this case the reins themselves actuate the brake directly when both ends are simultaneously pulled by the driver. The ends of the reins $j$ after passing around on either side of the grooved sector $h^2$, attached to the shaft $h$, are passed over guide-pulleys $l\ l$, mounted in a bracket $l'$, secured to the upper part of the bracket $h^5$, and thence downward and over the guide-pulleys $m\ m$, mounted in the ends of arms $m'\ m'$, keyed upon a shaft $m^2$, rotatably mounted in a bracket $m^3$, secured to the bracket $h'$. The shaft $m^2$ projects beyond the bracket $m^3$ and is provided at its projecting end with the downwardly-extending arm $i$, which controls the brake and supply (or exhaust) valve. After passing around these guide-pulleys the reins are continued upward and over guide-pulleys $l^2\ l^2$, mounted in the bracket $l'$, and thence to the hand of the driver. In this arrangement the spring $h^0$ is attached at one end to an arm $m^4$ on the shaft $m^2$ and at the other end to the bracket $h'$. With this arrangement the steering-wheels $c\ c$ are actuated in a manner similar to that described with reference to the preceding modification by pulling one or the other end of the reins. To apply the brake, both reins are also simultaneously pulled. The simultaneous pull upon the reins draws upward the pulleys $m\ m$, thus turning the arms $m'$ and shaft $m^2$ so as to pull the arm $i$ in the direction of the arrow shown in Fig. 6 and apply the brake band or blocks or operate the supply (or exhaust) valve.

It will be obvious that the steering-shaft could be arranged to actuate, through the medium of its bracket, a lever designed to throw the motor out of gear. This arrangement could be used in lieu of controlling the supply or exhaust valve.

Although I have described and shown the steering-shaft $h$ as operated by means of reins, it will be clear that the said shaft can be controlled by means of handles or a steering-wheel, if desired.

Having now particularly described and ascertained the nature of my said invention and in what manner the same is to be performed, I declare that what I claim is—

1. In a self-propelled vehicle, the combination with the prime motor, a controlling device therefor and steering-wheels, of a horizontal worm-shaft, a worm-segment gearing therewith, connections between said segment and the steering-wheels, a vertical shaft, gearing connecting said vertical shaft and said worm-shaft, reins operatively connected with said vertical shaft for rotating it to effect the steering of the vehicle, a lever controlled by the said reins, operative connections between said lever and the controlling device for the prime motor, substantially as described.

2. In a self-propelled vehicle, the combination with the prime motor, a controlling device therefor and steering-wheels, of a horizontal worm-shaft, a worm-segment gearing therewith, connections between said segment and the steering-wheels, a vertical shaft, gearing connecting said vertical shaft and said worm-shaft, reins operatively connected with said vertical shaft for rotating it to effect the steering of the vehicle, a lever controlled by the said reins, operative connections between said lever and the controlling device for the prime motor, a brake and connections between said brake and said lever, substantially as described.

3. In a self-propelled vehicle, the combination with a horizontal worm-shaft, a worm-segment gearing therewith and operatively connected with the steering-wheels, a vertically-disposed revoluble shaft, operative connections between said shaft and the worm-shaft for driving the latter, means permitting the said vertical shaft to move transversely of its longitudinal axis, and a connection from said vertical shaft extending to the controlling device for the motor, substantially as described.

4. In a self-propelled vehicle, the combination with the prime motor, a controlling device therefor and the steering-wheels, of a horizontal worm-wheel, a segment gearing therewith, connections from said segment to the steering-wheels, a revoluble shaft, mounted in bearings permitting it to move transversely of its axis, gearing connecting said vertical shaft and said worm-shaft, a lever-arm connected with said shaft and adapted to be moved by the said transverse movement of said vertical shaft, and operative connections between the said lever-arm and the said motor-controlling device, substantially as described.

5. In a self-propelled vehicle, the combination with the prime motor, a controlling device therefor and the steering-wheels, of a horizontal worm-shaft, a segment gearing therewith and operatively connected with the steering-wheels, a bearing-bracket pivotally mounted on the worm-shaft, a vertically-disposed shaft mounted in said bearing-bracket, gearing connecting said worm-shaft and said vertical shaft, a lever-arm connected with said bracket, and connections between said lever-arm and said motor-controlling device, substantially as described.

HENRY COURTEEN.

Witnesses:
WILLIAM WATKINS,
LIONEL W. BUCHLEY.